US012504137B2

(12) United States Patent
Yang et al.

(10) Patent No.: US 12,504,137 B2
(45) Date of Patent: Dec. 23, 2025

(54) LAMP AND VEHICLE

(71) Applicant: BEIJING CHEHEJIA AUTOMOBILE TECHNOLOGY CO., LTD., Beijing (CN)

(72) Inventors: Xiaoyu Yang, Beijing (CN); Shiying Zhang, Beijing (CN)

(73) Assignee: BEIJING CHEHEJIA AUTOMOBILE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/734,966

(22) Filed: Jun. 5, 2024

(65) Prior Publication Data

US 2024/0318800 A1 Sep. 26, 2024

Related U.S. Application Data

(63) Continuation of application No. PCT/CN2022/135964, filed on Dec. 1, 2022.

(30) Foreign Application Priority Data

Dec. 8, 2021 (CN) ........................ 202123072079.3

(51) Int. Cl.

| | |
|---|---|
| ***F21S 41/25*** | (2018.01) |
| ***F21S 41/37*** | (2018.01) |
| ***F21V 17/16*** | (2006.01) |
| *F21W 102/20* | (2018.01) |

(52) U.S. Cl.

CPC ............... *F21S 41/25* (2018.01); *F21S 41/37* (2018.01); *F21V 17/164* (2013.01); *F21W 2102/20* (2018.01)

(58) Field of Classification Search

CPC ......... F21S 41/25; F21S 41/37; F21V 17/164; F21W 2102/20

See application file for complete search history.

(56) References Cited

FOREIGN PATENT DOCUMENTS

| | | | |
|---|---|---|---|
| CN | 208620281 | U | 3/2019 |
| CN | 209944221 | U | 1/2020 |
| CN | 210951143 | U | 7/2020 |
| CN | 111637418 | A | 9/2020 |
| CN | 213920834 | U | 8/2021 |
| CN | 216976690 | U | 7/2022 |
| JP | H09219105 | A | 8/1997 |
| JP | 2008084805 | A | 4/2008 |
| JP | 2019192592 | A | 10/2019 |

OTHER PUBLICATIONS

EP22903299.0 extended European search report dated Feb. 21, 2025.

PCT/CN2022/135964 international search report.

*Primary Examiner* — Elmito Breval

(74) *Attorney, Agent, or Firm* — IPro, PLLC

(57) ABSTRACT

A lamp includes a light source, a reflecting mirror, an internal lens and a wall element. The reflecting mirror is configured to reflect light rays emitted by the light source to the internal lens, the light rays sequentially pass through the internal lens and the wall element and exit. The internal lens includes a main body, a first protruding part and a second protruding part, and both of the first protruding part and the second protruding part abut the wall element, so that a gap is formed between the main body of the internal lens and the wall element.

20 Claims, 3 Drawing Sheets

LAMP AND VEHICLE

CROSS REFERENCE TO RELEVANT APPLICATIONS

The present application is the national stage of International Application No. PCT/CN2022/135964, field on Dec. 1, 2022, which is filed on the basis of and claims the priority of the Chinese Patent Application No. CN202123072079.3, filed on Dec. 8, 2021, the entire contents of which are incorporated herein by reference.

TECHNICAL FIELD

The present disclosure relates to the technical field of vehicles and more particularly, to a lamp and a vehicle.

BACKGROUND

Vehicle lamps serve for illumination and decoration. Currently, the designs of vehicle-lamp products have upgraded from pursuing satisfaction of demands on functions to pursuing aesthetic perception. On the precondition that the functions of the lamps are satisfied, in order to significantly improve the technological sense of the modeling of the entire vehicle and the brand value, many vehicle enterprises are putting forth new ideas in the modeling designs of the lamps, so as to attract the consumers.

In general, vehicle lamps include a light source, a reflecting mirror, an internal lens and a wall element, the internal lens is a transparent component, in some embodiments, it can be a thin-walled transparent plastic component used to refract parallel light beams reflected by the reflecting mirror, so as to provide good and uniform illumination on the front road surface and curb of the vehicle. The wall element is a component with a thickness exceeding 4 mm, and in some embodiments, it can be a plastic component used for optical homogenization. In related art, the internal lens and the reflecting mirror are usually assembled together.

SUMMARY

In order to solve the above technical problem or at least partially solve the above technical problem, the present disclosure provides a lamp and a vehicle.

The first aspect of the present disclosure provides a lamp, the lamp includes a light source, a reflecting mirror, an internal lens and a wall element, the reflecting mirror is configured to reflect light rays emitted by the light source to the internal lens, and the light rays sequentially pass through the internal lens and the wall element and exit; and the internal lens includes a main body, a first protruding part and a second protruding part, and both of the first protruding part and the second protruding part abut the wall element, so that a gap is formed between the main body of the internal lens and the wall element.

In some embodiments, the wall element includes a light entering part and a light exiting part; and along a height direction of the wall element, a distance L1 between the first protruding part and the second protruding part satisfies L2<L1<L3;

where L2 is a thickness of the light exiting part, and L3 is a thickness of the light entering part.

In some embodiments, the wall element is provided with a first mounting part and a second mounting part, and the first mounting part and the second mounting part are separate; and the internal lens is provided with a first snap-fitting component and a second snap-fitting component, the first snap-fitting component is connected to the first mounting part, and the second snap-fitting component is connected to the second mounting part.

In some embodiments, the first snap-fitting component includes a snap-fitting seat extending from the internal lens toward the wall element, and the snap-fitting seat is provided with a snap-fitting slot; and the first mounting part includes a protrusion, the protrusion is provided at a bottom surface of the wall element along the height direction of the wall element, and the protrusion and the snap-fitting slot are matched with each other in a plug-in way.

In some embodiments, the protrusion includes a first abutting surface and a first directing bevel, the first directing bevel is disposed close to the internal lens, and the first directing bevel inclines from the bottom surface of the wall element toward the first abutting surface.

In some embodiments, the second snap-fitting component includes a snap-fitting block extending from the internal lens toward the wall element, the second mounting part includes a snap-fitting hole, and the snap-fitting block is snap-fitted to the snap-fitting hole.

In some embodiments, the snap-fitting block includes a side surface, the side surface is provided with a boss, and the snap-fitting block is inserted into the snap-fitting hole, so that the boss is snap-fitted to the snap-fitting hole.

In some embodiments, the boss includes a second abutting surface and a second directing bevel that intersect, the second abutting surface extends from the side surface toward the second directing bevel, and the second directing bevel extends from the side surface toward the second abutting surface; and the snap-fitting block is inserted into the snap-fitting hole, so that the second abutting surface abuts the wall element.

In some embodiments, an included angle between the second abutting surface and the side surface is less than an included angle between the second directing bevel and the side surface.

In some embodiments, the included angle between the second abutting surface and the side surface is 90°.

In some embodiments, the first mounting part and the second mounting part are staggered along the height direction of the wall element.

In some embodiments, the internal lens deforms following a contour of the wall element to maintain the gap between the main body of the internal lens and the wall element constant.

In some embodiments, the internal lens is manufactured by using a material having a light transmittance greater than or equal to 90%, and/or, the wall element is manufactured by using a material having a light transmittance greater than or equal to 90%.

In some embodiments, the reflecting mirror is a plastic injection-molded piece with or without aluminum plating for light-ray focusing.

The second aspect of the present disclosure provides a vehicle, the vehicle includes the lamp according to any one of the embodiments in the first aspect.

BRIEF DESCRIPTION OF THE DRAWINGS

The drawings here are incorporated into the description and form part of the description. The drawings show the embodiments of the present disclosure, and interpret the principle of the present disclosure together with the description.

In order to more clearly illustrate the technical solutions of the embodiments of the present disclosure or the prior art, the figures that are required to describe the embodiments or the prior art will be briefly described below. Apparently, a person skilled in the art can obtain other figures according to these figures without paying creative work.

Reference numbers: 1: light source; 2: reflecting mirror; 3: internal lens; 31: snap-fitting seat; 311: snap-fitting slot; 32: snap-fitting block; 321: side surface; 322: boss; 322*a*: second abutting surface; 322*b*: second directing bevel; 33: first protruding part; 34: second protruding part; 4: wall element; 41: protrusion; 43: light exiting part; 44: light entering part; 411: first abutting surface; 412: first directing bevel; and 42: snap-fitting hole.

DETAILED DESCRIPTION

In order to comprehend the above purposes, features and advantages of the present disclosure more clearly, the solutions of the present disclosure will be described further below. It should be noted that, subject to the avoiding of any conflict, the embodiments and the features of the embodiments of the present disclosure may be combined.

Many particular details are described in the following description to facilitate sufficient comprehension of the present disclosure, but the present disclosure may also be implemented in manners different from those described herein. Apparently, the embodiments in the description are merely some of the embodiments of the present disclosure, rather than all of the embodiments.

In related art, an internal lens and a reflecting mirror are assembled together by snap fitting. After mass production, because of the thickness of the wall element, after the wall element is injection-molded, its deformation is different from the trend in deformation of the subassembly of the internal lens and the reflecting mirror, which causes that the gap between the wall element and the internal lens are inconstant. Since the gap between the wall element and the internal lens forms dark lines at the front surface of the wall element, if the gap is inconstant, it will cause the dark lines seen from the front surface of the lamp to have unequal widths, thereby affecting the appearance.

In view of the above, the embodiments of the present disclosure provide a lamp, in which, by the adjustment of the relation and the sequence in the assembling of the wall element, the internal lens and the reflecting mirror, the gap between the wall element and the internal lens is constant, to ensure the evenness of the appearance of the dark lines seen from the front surface of the lamp.

Figure 1:
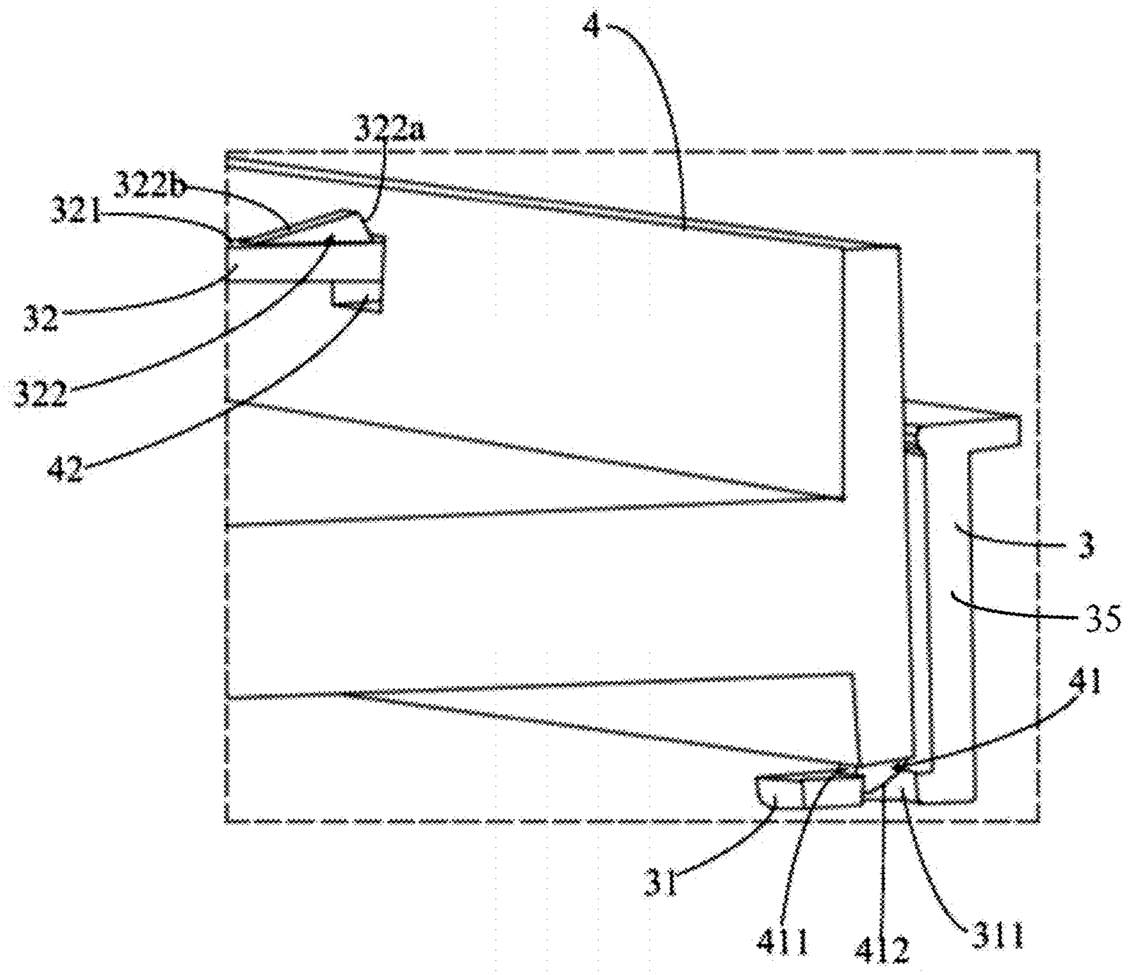
FIG. 1 is a schematic structural diagram of a lamp according to an embodiment of the present disclosure.
Figure 2:
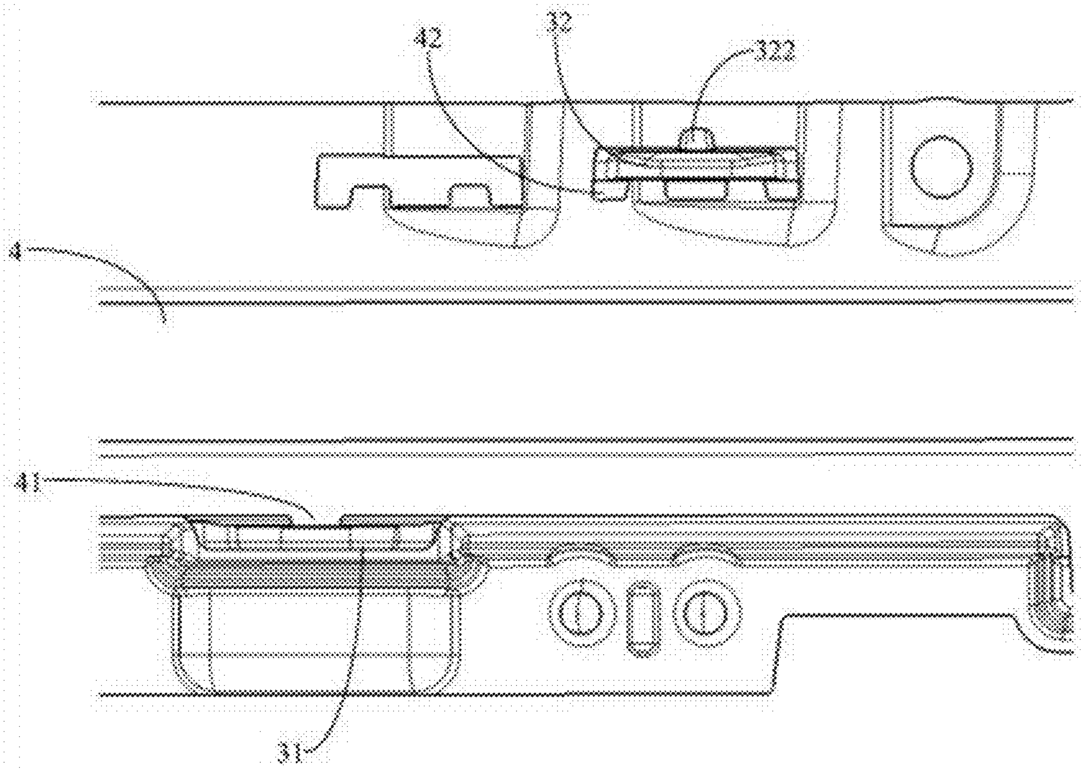
FIG. 2 is another schematic structural diagram of a lamp according to an embodiment of the present disclosure.
Figure 3:
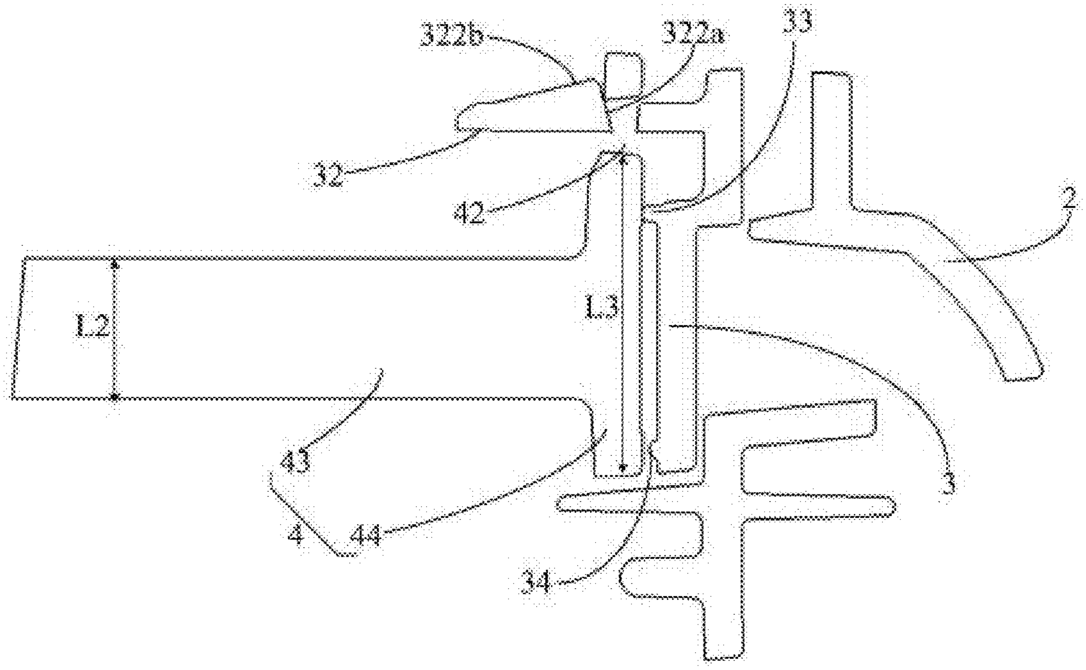
FIG. 3 is a cross-sectional view of a lamp according to an embodiment of the present disclosure.
Figure 4:
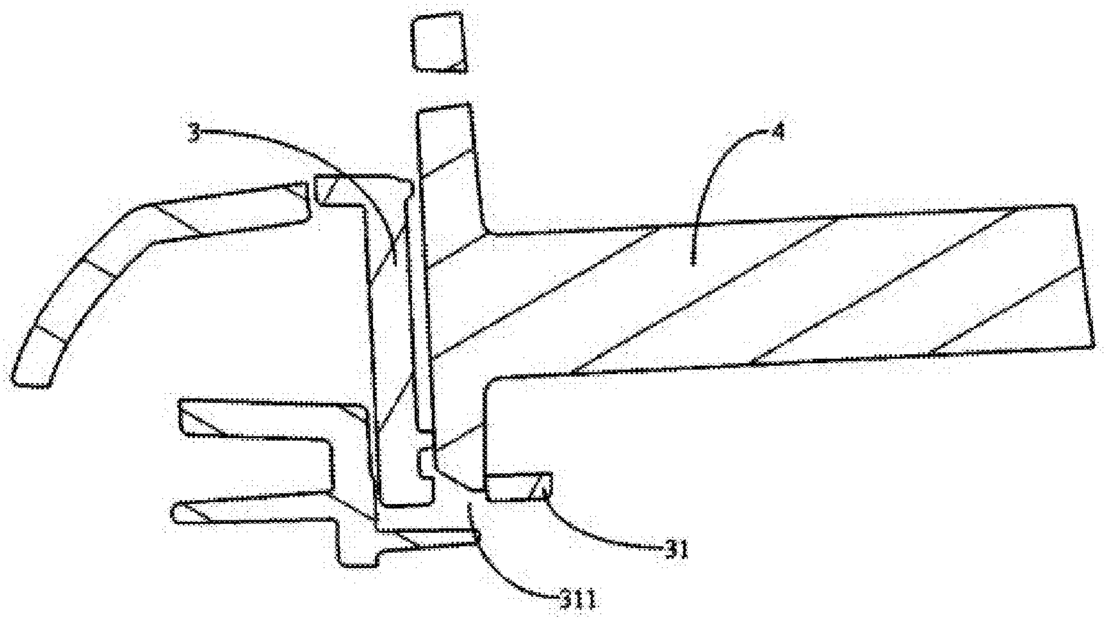
FIG. 4 is another cross-sectional view of a lamp according to an embodiment of the present disclosure.
Figure 5:
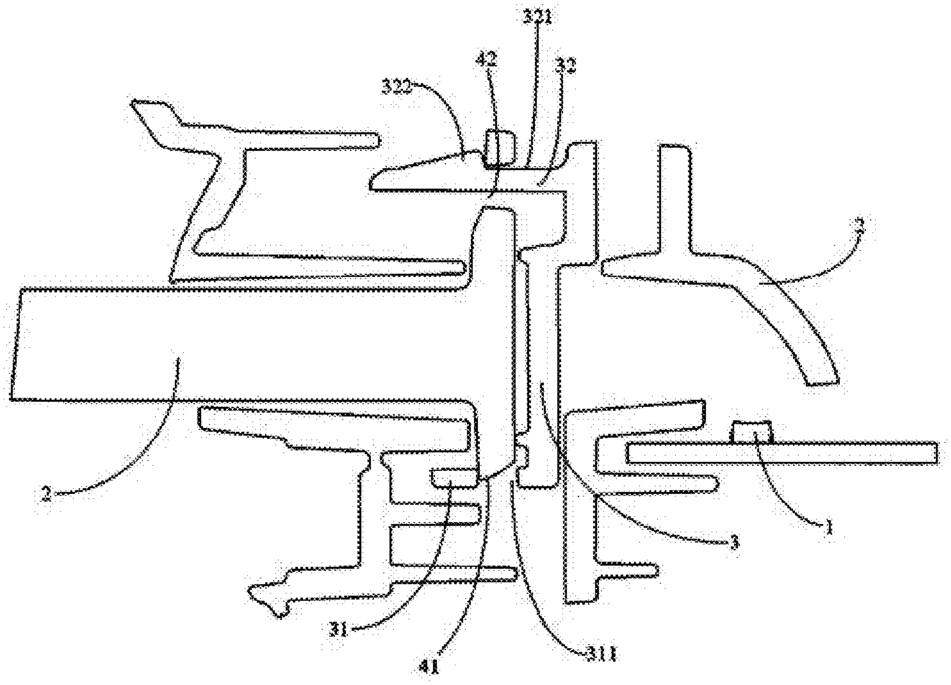
FIG. 5 is yet another cross-sectional view of a lamp according to an embodiment of the present disclosure.

Referring to FIG. 1, FIG. 2, FIG. 3, FIG. 4 and FIG. 5, the lamp according to the embodiments of the present disclosure includes a light source 1, a reflecting mirror 2, an internal lens 3 and a wall element 4. All of the two ends of the internal lens 3 and the two ends of the wall element 4 extend toward the two sides of the vehicle. The light rays emitted by the light source 1 are reflected by the reflecting mirror 2 to the internal lens 3, sequentially pass through the internal lens 3 and the wall element 4, and exit, which may enable the light emission of the light emitting face to be uniform. By the cooperation of the light source 1, the internal lens 3 and the wall element 4, the vehicle lamp may realize an excellent effect of light emission, which improves the user experience. The internal lens 3 is connected to the wall element 4, and the internal lens 3 may be sheet-like. The sheet-like internal lens 3 is soft, so that the internal lens 3 may deform following the contour of the wall element 4, to ensure the gap between the internal lens 3 and the wall element 4, which ensures evenness of the dark lines, to ensure the effect of uniform lightening. The present disclosure, while ensuring the transparency of the wall element and the effect of suspension, ensures the uniformity and the optical effect, improves the optical uniformity of the transparent wall element 4, and prevents unevenness of the dark lines.

The internal lens 3 includes a main body 35, a first protruding part 33 and a second protruding part 34, and both of the first protruding part 33 and the second protruding part 34 abut the wall element 4, whereby the main body 35 of the internal lens 3 and the wall element 4 form a gap therebetween. By using the first protruding part 33 and the second protruding part 34, the main body 35 of the internal lens 3 and the wall element 4 may form a constant gap therebetween, which ensures the uniformity and the optical effect, improves the optical uniformity of the transparent wall element 4, and prevents unevenness of the dark lines.

The internal lens 3 may be manufactured by using any material that satisfies the requirement on the light transmittance. In some embodiments, the internal lens 3 is manufactured by using a material having a light transmittance greater than or equal to 90%. In some embodiments, the internal lens 3 is a thin-wall injection-molded piece used for optical uniformization, the internal lens 3 may be manufactured by using various materials, for example, a diffusible material, and the internal lens 3 is joined to the front wall element 4 by secondary injection molding to form a combined optical solution to ensure the optical uniformity and the optical effect. In some embodiments, the internal lens 3 may be a PC photodiffusion plastic, i.e., a light-transmitting but non-transparent photodiffusion-material particle that is formed by polymerization in a special process with a transparent PC (polycarbonate) plastic as the matrix, and a photo-diffuser and other additives of a certain proportion. The wall element 4 may be manufactured by using any material that satisfies the requirement on the light transmittance. In some embodiments, the wall element 4 is manufactured by using a material having a light transmittance greater than or equal to 90%. In some embodiments, the wall element 4 is an injection-molded piece used for optical uniformization. The reflecting mirror 2 may be of a metal material, and may also be of a plastic material. In some embodiments, the reflecting mirror 2 is a plastic injection-molded piece with or without aluminum plating for light-ray.

In some embodiments, the wall element 4 includes a light entering part 44 and a light exiting part 43. In the height direction of the wall element 4, the distance L1 (not shown in the figure) between the first protruding part 33 and the second protruding part 34 satisfies $L2<L1<L3$, where L2 is the thickness of the light exiting part 43, and L3 is the thickness of the light entering part 44. That may ensure the constant gap between the main body 35 of the internal lens 3 and the wall element 4, so that the dark lines seen from the front surface of the lamp have even widths, to ensure the effect of uniform lightening. The embodiment of the present disclosure, while ensuring the transparency of the wall element and the effect of suspension, ensures the uniformity and the optical effect, improves the optical uniformity of the transparent wall element 4, and prevents unevenness of the dark lines.

In some embodiments, the wall element 4 is provided with a first mounting part and a second mounting part, and the first mounting part and the second mounting part are disposed at an interval. The internal lens 3 is provided with a first snap-fitting component and a second snap-fitting component, the first snap-fitting component is connected to the first mounting part, and the second snap-fitting component is connected to the second mounting part. The first snap-fitting component and the first mounting part may be connected by a fastener, and may also be connected by snap fitting. The second snap-fitting component and the second mounting part may be connected by a fastener, and may also be connected by snap fitting.

When the first snap-fitting component and the first mounting part are connected by snap fitting, one of the first snap-fitting component and the first mounting part may be provided with a snap-fitting protrusion, the other of the first snap-fitting component and the first mounting part may be provided with a snap-fitting slot or a snap-fitting hole, and the position of the snap-fitting slot or the snap-fitting hole corresponds to the snap-fitting protrusion, so that the snap-fitting protrusion is snap-fitted to the snap-fitting slot or the snap-fitting hole. When the second snap-fitting component and the second mounting part are connected by snap fitting, one of the second snap-fitting component and the second mounting part may be provided with a snap-fitting protrusion, the other of the second snap-fitting component and the second mounting part may be provided with a snap-fitting slot or a snap-fitting hole, and the position of the snap-fitting slot or the snap-fitting hole corresponds to the snap-fitting protrusion, so that the snap-fitting protrusion is snap-fitted to the snap-fitting slot or the snap-fitting holc.

The first snap-fitting component and the first mounting part, and the second snap-fitting component and the second mounting part, may be connected in any suitable manner, as long as the internal lens 3 and the wall element 4 may be connected together, whereby the internal lens 3 may deform following the contour of the wall element 4. As the internal lens 3 deforms following the wall element 4, the constant gap between the main body 35 of the internal lens 3 and the wall element 4 may be ensured, which ensures evenness of the dark lines, to ensure the effect of uniform lightening. The embodiment of the present disclosure, while ensuring the transparency of the wall element and the effect of suspension, ensures the uniformity and the optical effect, improves the optical uniformity of the transparent wall element 4, and prevents unevenness of the dark lines.

In some embodiments, the first snap-fitting component includes a snap-fitting seat 31 extending from the internal lens 3 toward the wall element 4, and the snap-fitting seat 31 is provided with a snap-fitting slot 311. The first mounting part includes a protrusion 41, the protrusion 41 is provided at the bottom surface of the wall element 4 in the height direction of the wall element 4, and the protrusion 41 and the snap-fitting slot 311 are matched with each other in a plug-in way. The installation may include inserting the protrusion 41 into the snap-fitting slot 311, subsequently rotating the internal lens 3 with the position of the protrusion 41 as the shaft, to cause the top of the internal lens 3 to approach the wall element 4, and finally connecting the second snap-fitting component to the second mounting part, whereby the internal lens 3 and the wall element 4 may be fixed together. Which cannot only prevent shaking of the internal lens 3, but also simplifies the assembling of the internal lens 3 and the wall element 4, which increases the efficiency of the assembling of the internal lens 3 and the wall element 4, and thus increases the efficiency of the assembling of the lamp. In the embodiments of the present disclosure, as the internal lens 3 and the wall element 4 are connected together, the internal lens 3 may deform following the contour of the wall element 4, to ensure the constant gap between the main body 35 of the internal lens 3 and the wall element 4, which ensures evenness of the dark lines, to ensure the effect of uniform lightening. Furthermore, the embodiment of the present disclosure, while ensuring the transparency of the wall element and the effect of suspension, ensures the uniformity and the optical effect, improves the optical uniformity of the transparent wall element 4, and prevents unevenness of the dark lines.

In some embodiments, the protrusion 41 includes a first abutting surface 411 and a first directing bevel 412, the first directing bevel 412 is disposed close to the internal lens 3, and the first directing bevel 412 inclines from the bottom surface of the wall element 4 toward the first abutting surface 411. When the protrusion 41 and the snap-fitting slot 311 are connected by insertion, the first directing bevel 412 may facilitate the protrusion 41 to be clipped to the snap-fitting slot 311, and such a structure is simple and easy to implement. The installation may include inserting the protrusion 41 into the snap-fitting slot 311, subsequently rotating the internal lens 3 with the position of the protrusion 41 as the shaft, to cause the internal lens 3 to bypass the first directing bevel 412, to cause the top of the internal lens 3 to approach the wall element 4, and finally connecting the second snap-fitting component to the second mounting part. At this point, the first abutting surface 411 abuts the side wall of the snap-fitting slot 311, so that the internal lens 3 and the wall element 4 are fixed together. Which cannot only prevent shaking of the internal lens 3, but also simplifies the assembling of the internal lens 3 and the wall element 4, which increases the efficiency of the assembling of the internal lens 3 and the wall element 4, and thus increases the efficiency of the assembling of the lamp. As the internal lens 3 and the wall element 4 are connected together, the internal lens 3 may deform following the contour of the wall element 4, to ensure the constant gap between the main body 35 of the internal lens 3 and the wall element 4, which ensures evenness of the dark lines, to ensure the effect of uniform lightening. The embodiment of the present disclosure, while ensuring the transparency of the wall element and the effect of suspension, ensures the uniformity and the optical effect, improves the optical uniformity of the transparent wall element 4, and prevents unevenness of the dark lines.

In some embodiments, the second snap-fitting component includes a snap-fitting block 32 extending from the internal lens 3 toward the wall element 4, the second mounting part includes a snap-fitting hole 42, and the snap-fitting block 32 is snap-fitted to the snap-fitting hole 42. The installation may include inserting the protrusion 41 into the snap-fitting slot 311, subsequently rotating the internal lens 3 with the position of the protrusion 41 as the shaft, to cause the internal lens 3 to bypass the first directing bevel 412, to cause the top of the internal lens 3 to approach the wall element 4, and finally snap-fitting the snap-fitting block 32 to the snap-fitting hole 42. At this point, the internal lens 3 and the wall element 4 are fixed together. Which cannot only prevent shaking of the internal lens 3, but also simplifies the assembling of the internal lens 3 and the wall element 4, which increases the efficiency of the assembling of the internal lens 3 and the wall element 4, and thus increases the efficiency of the assembling of the lamp. As the internal lens 3 and the wall element 4 are connected together, the internal lens 3 may deform following the contour of the wall element 4, to ensure the constant gap between the main body 35 of the internal lens 3 and the wall element 4, which ensures evenness of the dark lines, to ensure the effect of uniform lightening. The embodiment of the present disclosure, while ensuring the transparency of the wall element and the effect of suspension, ensures the uniformity and the optical effect, improves the optical uniformity of the transparent wall element 4, and prevents unevenness of the dark lines.

In some embodiments, the snap-fitting block 32 includes a side surface 321, the side surface 321 is provided with a boss 322, and the snap-fitting block 32 is inserted into the snap-fitting hole 42 to cause the boss 322 to be snap-fitted to the snap-fitting hole 42. The installation may include inserting the protrusion 41 into the snap-fitting slot 311, subsequently rotating the internal lens 3 with the position of the protrusion 41 as the shaft, to cause the top of the internal lens 3 to approach the wall element 4, and finally the boss 322 passes through the snap-fitting hole 42 and is snap-fitted to the snap-fitting hole 42 after inserting the snap-fitting block 32 into the snap-fitting hole 42. At this point, the internal lens 3 and the wall element 4 are connected together. Which cannot only prevent shaking of the internal lens 3, but also simplifies the assembling of the internal lens 3 and the wall element 4, which increases the efficiency of the assembling of the internal lens 3 and the wall element 4, and thus increases the efficiency of the assembling of the lamp.

In some embodiments, the boss 322 includes a second abutting surface 322*a* and a second directing bevel 322*b* that intersect, the second abutting surface 322*a* extends from the side surface 321 toward the second directing bevel 322*b*, and the second directing bevel 322*b* extends from the side surface 321 toward the second abutting surface 322*a*. The snap-fitting block 32 is inserted into the snap-fitting hole 42, so that the second abutting surface 322*a* abuts the wall element 4. The second directing bevel 322*b* may facilitate the boss 322 to pass through the snap-fitting hole 42, so that the second abutting surface 322*a* of the boss 322 abuts the wall element 4. Such a structure is simple and easy to implement, which increases the efficiency of the assembling of the internal lens 3 and the wall element 4, and thus increases the efficiency of the assembling of the lamp. The boss 322 passes through the snap-fitting hole 42 and is snap-fitted to the snap-fitting hole 42, to connect the internal lens 3 and the wall element 4 together. Which cannot only prevent shaking of the internal lens 3, but also simplifies the assembling of the internal lens 3 and the wall element 4. The particular installation process may include inserting the protrusion 41 into the snap-fitting slot 311, subsequently rotating the internal lens 3 with the position of the protrusion 41 as the shaft, to cause the internal lens 3 to bypass the first directing bevel 412, to cause the top of the internal lens 3 to approach the wall element 4, and finally inserting the snap-fitting block 32 into the snap-fitting hole 42 along the second directing bevel 322*b*. After the boss 322 of the snap-fitting block 32 passes through the snap-fitting hole 42, by the rebounding force of the internal lens 3, the second abutting surface 322*a* abuts the wall element 4. Such a structure is simple and easy to implement, which increases the efficiency of the assembling of the internal lens 3 and the wall element 4, and thus increases the efficiency of the assembling of the lamp. As the internal lens 3 and the wall element 4 are connected together, the internal lens 3 may deform following the contour of the wall element 4, to ensure the constant gap between the main body 35 of the internal lens 3 and the wall element 4, which ensures evenness of the dark lines, to ensure the effect of uniform lightening. Furthermore, the embodiment of the present disclosure, while ensuring the transparency of the wall element and the effect of suspension, ensures the uniformity and the optical effect, improves the optical uniformity of the transparent wall element 4, and prevents unevenness of the dark lines.

In some embodiments, the included angle between the second abutting surface 322*a* and the side surface 321 is less than the included angle between the second directing bevel 322*b* and the side surface 321. When the snap-fitting block 32 is inserted into the snap-fitting hole 42 along the second directing bevel 322*b*, the second directing bevel 322*b* facilitates the snap-fitting block 32 to be inserted into the snap-fitting hole 42, which may increase the efficiency of the assembling. After the snap-fitting block 32 is inserted into the snap-fitting hole 42 along the second directing bevel 322*b* and the boss 322 passes through the snap-fitting hole 42, the second abutting surface 322*a* abuts the wall element 4, and because the included angle between the second abutting surface 322*a* and the side surface 321 is larger, the stability of the connection may be increased, and the possibility with which the internal lens 3 shakes may be reduced. In some embodiments, the included angle between the second abutting surface 322*a* and the side surface 321 is 90°, which may increase the stability of the connection, and reduce the possibility with which the internal lens 3 shakes.

In some embodiments, the first mounting part and the second mounting part are staggered in the height direction of the wall element 4, which may increase the stability of the connection, and reduce the possibility with which the internal lens 3 shakes.

A vehicle according to an embodiment of the present disclosure includes the lamp according to the embodiments of the present disclosure. The vehicle according to the embodiments of the present disclosure has the same advantages as those of the lamp according to the embodiments of the present disclosure, and is not discussed further herein.

It should be noted that, in the present text, relation terms such as "first" and "second" are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

In the present disclosure, unless explicitly defined or limited otherwise, the terms "mount", "link", "connection" and "fix" should be interpreted broadly. For example, it may be fixed connection, detachable connection, or integral connection; it may be mechanical connection, electrical connection or mutual communication; and it may be direct connection or indirect connection by an intermediate medium, and may be internal communication between two elements or interaction between two elements, unless explicitly defined otherwise. A person skilled in the art may determine the particular meaning of the terms in the present disclosure according to particular situations.

In the present disclosure, unless explicitly defined or limited otherwise, that a first feature is "over" or "under" a second feature may include that the first feature and the second feature directly contact or that the first feature and the second feature indirectly contact via an intermediate medium. Furthermore, that a first feature is "above" a second feature may include that the first feature is directly over or obliquely over the second feature, or merely indicates that the vertical height of the first feature is greater than that of the second feature. That a first feature is "below" a second feature may include that the first feature is directly under or obliquely under the second feature, or merely indicates that the vertical height of the first feature is less than that of the second feature.

In the present disclosure, the terms "an embodiment", "some embodiments", "example", "particular example" or "some examples" and so on mean that particular features, structures, materials or characteristics described with reference to the embodiment or example are comprised in at least one of the embodiments or examples of the present disclosure. In the description, the illustrative expressions of the above terms do not necessarily relate to the same embodiment or example. Furthermore, the described particular features, structures, materials or characteristics may be combined in one or more embodiments or examples in a suitable form. Moreover, subject to avoiding contradiction, a person skilled in the art may combine different embodiments or examples described in the description and the features of the different embodiments or examples.

Although the above embodiments have already been illustrated and described, it can be understood that the above embodiments are illustrative, and should not be construed as a limitation on the present disclosure, and all of the variations, modifications, substitutions and alterations made to the above embodiments by a person skilled in the art fall within the protection scope of the present disclosure.

The invention claimed is:

1. A lamp, comprising a light source, a reflecting mirror, an internal lens and a wall element, wherein the internal lens is used for optical uniformization, the reflecting mirror is configured to reflect light rays emitted by the light source to the internal lens, and the light rays sequentially pass through the internal lens and the wall element and exit; and the internal lens comprises a main body, a first protruding part and a second protruding part, and both of the first protruding part and the second protruding part abut the wall element, so that a gap is formed between the main body of the internal lens and the wall element.

2. The lamp according to claim 1, wherein the wall element comprises a light entering part and a light exiting part; and along a height direction of the wall element, a distance L1 between the first protruding part and the second protruding part satisfies L2<L1<L3;

wherein L2 is a thickness of the light exiting part, and L3 is a thickness of the light entering part.

3. The lamp according to claim 1, wherein the wall element is provided with a first mounting part and a second mounting part, and the first mounting part and the second mounting part are disposed at an interval; and the internal lens is provided with a first snap-fitting component and a second snap-fitting component, the first snap-fitting component is connected to the first mounting part, and the second snap-fitting component is connected to the second mounting part.

4. The lamp according to claim 3, wherein the first snap-fitting component comprises a snap-fitting seat extending from the internal lens toward the wall element, and the snap-fitting seat is provided with a snap-fitting slot; and the first mounting part comprises a protrusion, the protrusion is provided at a bottom surface of the wall element along a height direction of the wall element, and the protrusion and the snap-fitting slot are matched with each other in a plug-in way.

5. The lamp according to claim 4, wherein the protrusion comprises a first abutting surface and a first directing bevel, the first directing bevel is disposed close to the internal lens, and the first directing bevel inclines from the bottom surface of the wall element toward the first abutting surface.

6. The lamp according to claim 3, wherein the second snap-fitting component comprises a snap-fitting block extending from the internal lens toward the wall element, the second mounting part comprises a snap-fitting hole, and the snap-fitting block is snap-fitted to the snap-fitting hole.

7. The lamp according to claim 6, wherein the snap-fitting block comprises a side surface, the side surface is provided with a boss, and the snap-fitting block is inserted into the snap-fitting hole, so that the boss is snap-fitted to the snap-fitting hole.

8. The lamp according to claim 7, wherein the boss comprises a second abutting surface and a second directing bevel that intersect, the second abutting surface extends from the side surface toward the second directing bevel, and the second directing bevel extends from the side surface toward the second abutting surface; and the snap-fitting block is inserted into the snap-fitting hole, so that the second abutting surface abuts the wall element.

9. The lamp according to claim 8, wherein an included angle between the second abutting surface and the side surface is less than an included angle between the second directing bevel and the side surface.

10. The lamp according to claim 9, wherein the included angle between the second abutting surface and the side surface is 90°.

11. The lamp according to claim 3, wherein the first mounting part and the second mounting part are staggered along a height direction of the wall element.

12. The lamp according to claim 1, wherein the internal lens deforms following a contour of the wall element to maintain the gap between the main body of the internal lens and the wall element constant.

13. The lamp according to claim 1, wherein the internal lens is manufactured by using a material having a light transmittance greater than or equal to 90%.

14. The lamp according to claim 1, wherein the wall element is manufactured by using a material having a light transmittance greater than or equal to 90%.

15. The lamp according to claim 1, wherein the reflecting mirror is a plastic injection-molded piece with or without aluminum plating for light-ray focusing.

16. The lamp according to claim 1, wherein the internal lens is a sheet-like internal lens, so that the internal lens deforms following a contour of the wall element.

17. The lamp according to claim 1, wherein the internal lens is a thin-wall injection-molded piece used for optical uniformization.

18. The lamp according to claim 1, wherein the internal lens is a polycarbonate (PC) photodiffusion plastic.

19. The lamp according to claim 1, wherein the reflecting mirror is of a metal material, or is of a plastic material.

20. A vehicle, wherein the vehicle comprises the lamp according to claim 1.

* * * * *